W. P. SCULLY.
BOWLING BALL.
APPLICATION FILED MAY 18, 1911.
1,021,490.
Patented Mar. 26, 1912.
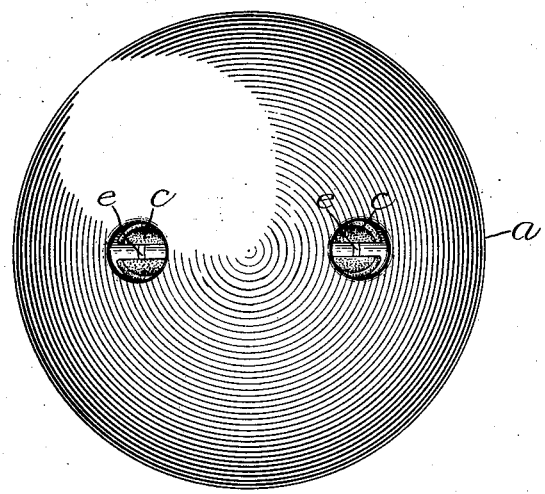
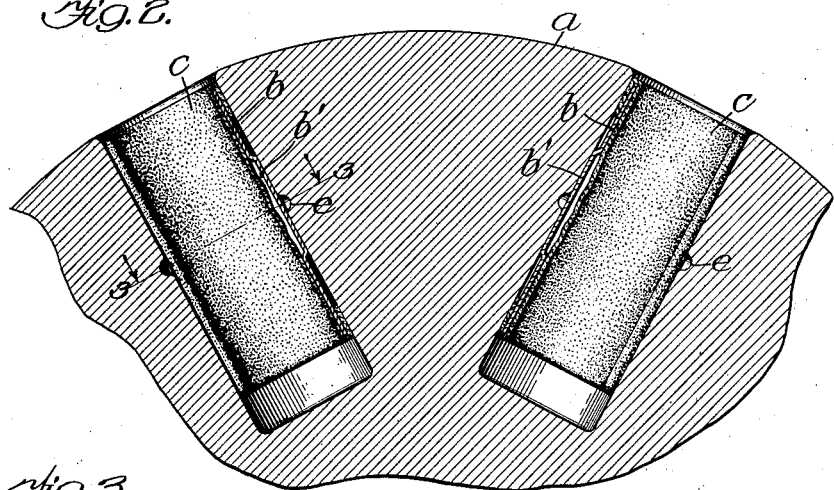
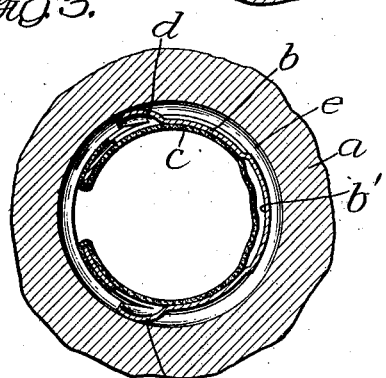
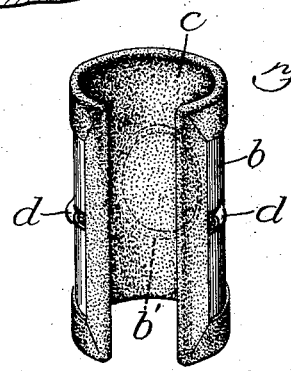
Witnesses:
Jno. H. Nelson Jr.
L. B. Graham
Inventor:
Walter P. Scully.
By G. L. Cragg,
Atty.

UNITED STATES PATENT OFFICE.

WALTER P. SCULLY, OF CHICAGO, ILLINOIS.

BOWLING-BALL.

1,021,490.  Specification of Letters Patent.  Patented Mar. 26, 1912.

Application filed May 18, 1911. Serial No. 628,094.

*To all whom it may concern:*

Be it known that I, WALTER P. SCULLY, citizen of the United States, residing at Chicago, in the county of Cook and State of Illinois, have invented a certain new and useful Improvement in Bowling-Balls, of which the following is a full, clear, concise, and exact description, reference being had to the accompanying drawings, forming a part of this specification.

My invention relates to bowling balls of the kind in which holes are employed for facilitating the grip upon the balls and resides in the provision of separable lining for the holes that presents desirable gripping surface of suitable extent, the object being to replace the gripping surface when its efficiency is impaired by wear, and which object is accomplished by replacing the worn lining by fresh lining.

My invention may generally be described as comprising, in its preferred embodiment, a ball provided with a hole for the purpose stated and a lining for this hole provided with a retaining member adapted for separable engagement with a complemental retaining member provided in the wall of the hole that is to be provided with the separable lining. The inner surface of this lining is of such a character as to increase the grip upon the ball and, for the purpose, this surface is desirably rough. When the gripping surface afforded by the lining has worn smooth, such lining is removed by separating the retaining members and is replaced by a fresh lining whose retaining member is engaged with the retaining member permanently provided upon the ball. In the preferred embodiment of the invention the separable lining is contractible to facilitate its entry and removal and is desirably resilient so that when the force that is used to contract it is removed it will automatically expand. By this construction the lining will automatically cause the engagement of the retaining members when the lining is fully inserted and thereafter released.

I will explain my invention more fully by reference to the accompanying drawing showing the preferred embodiment thereof and in which—

Figure 1 is a full view of a bowling ball provided with two gripping holes that are lined in accordance with the invention, Fig. 2 is a sectional view through a part of the ball taken through the axis of one of the holes, Fig. 3 is a sectional view on line 3—3 of Fig. 2, and Fig. 4 is a perspective view of the preferred form of separable lining as expanded when removed from the ball.

Like parts are indicated by similar characters of reference throughout the different views.

The bowing ball $a$ is made of any suitable or customary material and is radially recessed to afford holes in which a player's thumb and finger may be inserted to enable the ball the better to be grasped. The lining that is removably inserted within one or each of these holes preferably includes a thin curled sheet of tempered steel $b$ capable, when unrestrained, of distending to such an extent as to prevent its entry within the holes for which it is provided unless it is contracted. The shape of the steel is desirably that of an incomplete cylinder having longitudinal free edges between which a gap intervenes that extends longitudinally of the hole in which the lining containing the incomplete steel cylinder is inserted. This curled sheet of spring steel is desirably provided with a supplemental inner facing of felt $c$ that is of a character to afford desired frictional contact for the thumb or finger of the player. This facing is desirably continued over the top, bottom and longitudinal edges of the spring metal sheet to afford space between the metal and the body of the ball, this space being preferred as it enables the metal slightly to yield under finger and thumb pressure, a cushion action being the effect. The sheet $b$ is provided with an elliptical depression $b'$ where the lining is free of the sheet so as to be somewhat loose at this point to make the grip more certain. This feature of the invention is claimed irrespective of the removability of the lining. Duplicate retaining members $d$ are provided upon the lining compositely formed of the elements $b$ and $c$, these retaining members being desirably in the form of tongues projected backwardly from the sheet metal by being struck thereupon. The complemental retaining member upon the ball is desirably formed by means of an annular groove $e$ into which the tongues $d$ are projected upon the expansion of the sheet spring metal when the tongues reach the zone of the groove in the process of inserting the lining, it being understood that the lining is contracted to permit of its reception within the hole to which it is adapted, and that it expands, due to the resiliency of its spring sheet metal constituent, when the tongues *d* reach the groove *e*, whereby the lining is effectively and firmly held in place. The groove *e* is desirably located in a plane at right angles to the axis of the hole with which it communicates, and is preferably slightly nearer the top than the bottom of said hole. The tongues, which are preferably equidistant from the ends of the lining, may engage the groove without regard to the end of the lining that is first inserted. This characteristic enables me to reverse the lining when its upper part has become too worn, so that a fresh gripping surface may be presented by the same lining.

When the lining is no longer serviceable for the purpose for which it is provided, it may be withdrawn after it is so contracted as to disengage the retaining members *d* from the complemental retaining member provided upon the ball by the groove *e* whereafter a fresh lining may be substituted in a manner which is now clearly apparent.

While the lining desirably covers the greater part of the cylindrical surface of the hole to which it is adapted, I do not wish to be limited to the extent of the lining.

While I have herein shown and particularly described the preferred embodiment of my invention it is obvious that changes may readily be made without departing from the spirit of the invention. I do not therefore wish to be limited to the precise construction shown, but

Having thus described my invention I claim as new and desire to secure by Letters Patent the following:

1. A bowling ball having a thumb or finger receiving hole therein and a lining for the hole presenting a friction face to the interior of the hole, the wall of the hole and said lining being provided with separable engaging retaining members, said lining including a portion of sheet spring metal having a gap therein extending longitudinally of the hole to permit of the contraction of the lining, said sheet spring metal being of such a size as compared with the hole as to require contraction of the sheet spring metal in order to permit of the insertion of the lining within the hole, the sheet spring metal serving, by its resiliency, to expand when properly received within the hole to establish separable engagement between said retaining members.

2. A bowling ball having a thumb or finger receiving hole therein and a lining for the hole presenting a friction face to the interior of the hole and including a resilient portion having a gap therein extending longitudinally of the hole to permit of the contraction of the lining and causing the lining to be held in separable engagement with the ball, the wall of the hole and said lining being provided with separable engaging members whereby said lining may be readily removed and replaced.

3. A bowling ball having a thumb or finger receiving hole therein and a lining for the hole presenting a friction face to the interior of the hole, said lining including a portion of sheet spring metal having a gap therein extending longitudinally of the hole to permit of the contraction of the lining, said sheet spring metal being of such a size as compared with the hole as to require contraction of the sheet spring metal in order to permit of the insertion of the lining within the hole, the sheet spring metal serving, by its resiliency, to expand when received within the hole to establish separable engagement between the lining and ball.

4. A bowling ball having a thumb or finger receiving hole therein and a lining for the hole presenting a friction face to the interior of the hole and including a resilient portion having a gap therein extending longitudinally of the hole to permit of the contraction of the lining and causing the lining to be held in separable engagement with the ball.

5. A bowling ball having a thumb or finger receiving hole therein and a lining for the hole presenting a friction face to the interior of the hole and including a portion having a gap therein extending longitudinally of the hole to permit of the contraction of the lining and permitting the lining to be held in separable engagement with the ball.

In witness whereof, I hereunto subscribe my name this 12th day of May A. D. 1911.

WALTER P. SCULLY.

Witnesses:
FRANK J. KRATVEL,
JOSEPH H. SEBASTIAN.